United States Patent [19]

Nagai

[11] 4,214,935
[45] Jul. 29, 1980

[54] PROCESS FOR FUSION-BONDING OF RESINS

[76] Inventor: Kazuyoshi Nagai, 17-6, Kumisawa-Cho, Totsuka-Ku Yokohama City, Kanagawa Pref., Japan

[21] Appl. No.: 27,170

[22] Filed: Apr. 5, 1979

[51] Int. Cl.² .................. B05D 3/06; B29C 27/02
[52] U.S. Cl. .................... 156/272; 427/53.1; 427/195; 430/945
[58] Field of Search ............ 156/272, 283, 244.11, 156/244.24; 427/53, 195

[56] References Cited

U.S. PATENT DOCUMENTS

| | | | |
|---|---|---|---|
| 2,699,113 | 1/1955 | Hoover | 156/272 |
| 3,271,220 | 9/1966 | Geen | 156/272 |
| 3,740,287 | 6/1973 | Eichhorn | 427/53 |
| 4,156,626 | 5/1979 | Souder | 156/272 |

Primary Examiner—Michael G. Wityshyn
Attorney, Agent, or Firm—James E. Nilles

[57] ABSTRACT

A process for fusion-bonding of resins, which comprises applying a layer of thermoplastic resin having a light transmittance lower than 20% and a melting point of 40° to 250° C. to a substrate and fusion-bonding the resin layer to the substrate by emission energy of a flash discharge lamp. The electric input energy J (joule) of the flash discharge lamp is controlled relative to the weight of the resin layer.

1 Claim, 2 Drawing Figures

F I G. I
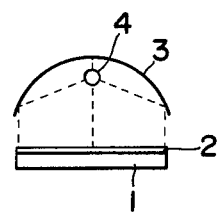
F I G. 2
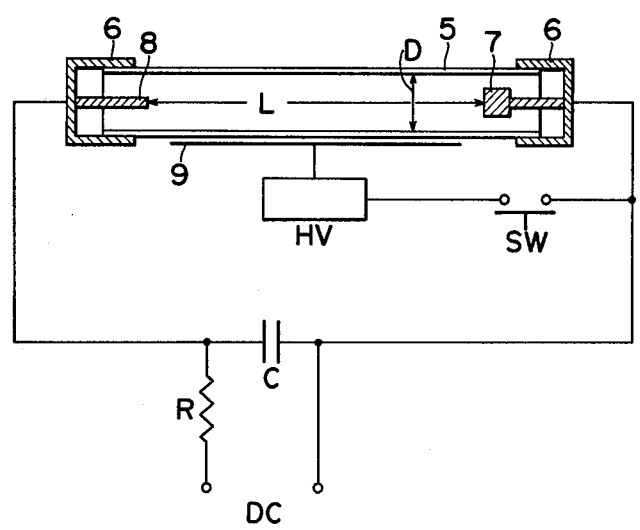

PROCESS FOR FUSION-BONDING OF RESINS

BACKGROUND OF THE INVENTION

(1) Field of the Invention

The present invention relates to a process for fusion-bonding of resins, which comprises fusion-bonding a powdery or filmy thermoplastic resin to a paper or plastic plate to form a thermoplastic resin layer thereon.

(2) Description of the Prior Art

Heating methods customarily used for thermally softening or fusion-bonding resins include a heat transfer heating method in which a resin is caused to fall in contact with a heat source and a non-contact heating method in which a resin is not caused to fall in contact with a heat source but is heated by, for example, ultrasonic heating or high frequency heating. These methods have merits and demerits and an appropriate method is selected according to the intended use and object.

For example, when even a slight contamination is not desired, the contact method is not preferred, but this method is advantageous in that the equipment is relatively small in size and is simple in structure. The non-contact ultrasonic or high frequency heating method is advantageous in that a resin is not contaminated at all, but is disadvantageous in that the size of the heating apparatus is large and the maintenance thereof is very trouble-some.

SUMMARY OF THE INVENTION

An object of the present invention is to provide a process for fusion-bonding of resins in which a powdery or filmy resin is heated and softened by a novel heating method quite different from the conventional heating methods and the softened resin is fusion-bonded to a paper or plastic plate. The process of the present invention is characterized in that a flash discharge lamp is used as a heat source and the energy J (joule) supplied to the lamp for emission is controlled so that the following relation to the weight of the resin layer is established:

$$4000 \geq J/(\frac{NG}{\Sigma S}) \geq 380$$

wherein J stands for the electric input (joule) necessary for one radiation, N stands for the area (cm$^2$) of the radiation region by one radiation, G stands for the total weight (g) of the resin layer in the radiation region by one radiation, and $\Sigma S$ stands for the total radiation area (cm$^2$) of the resin layer in the radiation region by one radiation.

Other objects and features of the present invention will be apparent from the following detailed description made with reference to the accompanying drawing.

BRIEF DESCRIPTION OF THE DRAWING

FIG. 1 is a diagram illustrating the method in which a resin is fusion-bonded to a paper by flashes of a flash discharge lamp.

FIG. 2 is a diagram illustrating a flash discharge lamp and a power source circuit.

DETAILED DESCRIPTION OF THE PREFERRED EMBODIMENTS

FIG. 1 illustrates the state where a resin layer 2 is fusion-bonded to a paper 1 by using a flash discharge lamp 4 including a mirror 3 disposed adjacently thereto.

FIG. 2 illustrates an instance of the structure of the flash discharge lamp 4 and a power source circuit therefor. Referring to FIG. 2, both the ends of a glass bulb 5 are air-tightly sealed by metal caps 6. Reference numerals 7 and 8 represent a cathode and an anode, respectively, and reference symbols L and D represent the flash discharge passage length and the inner diameter of the bulb 5, respectively. The power source circuit for causing emission in the flash discharge lamp 4 comprises a charging resistor R, a discharging capacitor C, a high voltage generator HV, a trigger switch SW, and a trigger electrode 9 connected to this high voltage generator HV.

Emission is caused in the flash discharge lamp 4 in the following manner.

Namely, the trigger switch SW is closed to give a high electric field to the flash discharge lamp 4 and ionize a filled gas contained between the cathode and anode. This, the charge of the discharging capacitor C is discharged through between the cathode and anode to cause emission in the flash discharge lamp 4.

In the present invention, the so generated flash is utilized as a heat energy. Since a paper or resin has peculiar properties to the light, even if the flash is radiated according to the method illustrated in FIG. 1, the resin layer is not always fusion-bonded to the paper in a good state. More specifically, a resin has ordinarily a good permeability to ultraviolet rays, visible rays and infrared rays, and therefore, even if a flash is radiated to a resin, the temperature cannot be elevated to a level sufficient to enable fushion-bonding of the resin.

Accordingly, in the process of the present invention, it is important that a heat absorbing agent capable of absorbing heat should be incorporated in advance into a resin to be fusion-bonded or the resin should be coated in advance with the heat absorbing agent.

Samples of the resin and paper used at the fundamental tests leading to the present invention were prepared, for example, in the following manner.

A powder mixture formed by mixing 80 mg of a polyethylene powder having a size of about 3 microns homogeneously with 80 mg of a graphite powder having a size of about 1 micron was applied in the form of a uniform layer on a radiation region having an area of 100 cm$^2$ on a commercially available blue plotting paper. From the results of various experiments, it was confirmed that the light transmittance of such layer should be lower than 20%.

When such sample is employed, the resin can be fusion-bonded to the blue plotting paper by the emission energy of the flash discharge lamp 4. For example, the resin can be fusion-bonded to the blue plotting paper in a good state if emission is conducted under such conditions that the discharge passage length L is 26 cm, the inner diameter D of the bulb is 8 mm, the amount of filled xenon gas is 215 mm Hg and the electric input J is 500 joules. Various flash lamps were prepared by filling rare gases such as xenon and mixed gases in glass bulbs having an inner diameter larger than 3 mm and a discharge passage length longer than 4 cm, and by using these flash lamps, fusion-bonding tests were carried out under different emission energy values J (joule). As a result, it was found that if the value J was higher than 640 joules or lower than 60 joules, good fusion-bonding could not be attained.

In the foregoing samples, since relations of $\Sigma S = N = 100 \text{ cm}^2$ and $G = 160 \times 10^{-3}$ g are established, the value of J/(NG/ΣS) is $$J/(\frac{NG}{\Sigma S}) \text{ is } 4000 \ (= \frac{640}{160 \times 10^{-3}})$$

when J is 640 joules or is $$380 \ (\approx \frac{60}{160 \times 10^{-3}})$$

when J is 60 joules. Thus, it has been confirmed that when the value of $$J/(\frac{NG}{\Sigma S})$$

is higher than 4000 or lower than 380, no good results can be obtained. More specifically, when this value is higher than 4000, the substrate is scorched or discolored, and when the value is lower than 380, the fusion-bonding is incomplete. Accordingly, in order to fusion-bond a powdery resin layer sufficiently to a paper or the like without scorching or discoloration of the paper or other substrate, it is important that the emission energy J (joule) is controlled so that the following relation to the weight of the resin layer is established:

$$4000 \geq J/(\frac{NG}{\Sigma S}) \geq 380$$

As will be apparent from the foregoing illustration, in the present invention, there is adopted a novel heating method utilizing the emission energy of a flash discharge lamp, which is quite different from the conventional heating methods, and a powdery or filmy resin is fusion-bonded to a paper by utilizing this novel heating method, and from the viewpoints of peculiar properties of the paper and resin to the light, the emission energy J (joule) is controlled so as to establish the relation of $$4000 \geq J/(\frac{NG}{\Sigma S}) \geq 380$$

to the weight of the resin layer, whereby fusion-bonding can be performed effectively and advantageously.

It is preferred that the melting point of the resin that is used in the present invention be within the range of from 40° C. to 250° C.

The prominent merit of the non-contact heating method, that is, the merit that the resin is not contaminated, can be attained in the present invention. Moreover, since the heat source used in the present invention comprises a flash discharge lamp, a mirror disposed adjacently thereto and a power source circuit, the heat source can be maintained, handled and controlled very easily. Accordingly, the process of the present invention has a high practical value. Still further, since the emission of the flash discharge lamp is instantaneous emission, excessive elevation of the temperature in an unnecessary region can be prevented and heating and fusion-bonding of the resin layer can be accomplished instantaneously when required. Accordingly, the process of the present invention can be advantageously applied to preparation of laminate papers or fusion fixation of toners to copying sheets in an electrophotographic copying machine.

What is claimed is:

1. A process for fusion-bonding of resins, which comprises applying a layer of a powdery of filmy thermoplastic resin having a light transmittance lower than 20% and a melting point of 40° to 250° C. to a substrate and fusion-bonding the resin layer to the substrate by emission energy of a flash discharge lamp, wherein the electric input energy J (joule) of the flash discharge lamp is controlled so that the following relation to the weight of the resin layer is established:

$$4000 \geq J/(\frac{NG}{\Sigma S}) \geq 380$$

wherein J stands for the electric input (joule) necessary for one radiation, N stands for the area (cm²) of the radiation region by one radiation, G stands for the total weight (g) of the resin layer in the radiation region by one radiation, and ΣS stands for the total radiation area (cm²) of the resin layer in the radiation region by one radiation.

* * * * *